United States Patent
Li

(10) Patent No.: US 7,372,892 B2
(45) Date of Patent: May 13, 2008

(54) SIMPLE AND ROBUST DIGITAL CODE TRACKING LOOP FOR WIRELESS COMMUNICATION SYSTEMS

(75) Inventor: Bin Li, Ronkonkoma, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 166 days.

(21) Appl. No.: 10/425,176

(22) Filed: Apr. 28, 2003

(65) Prior Publication Data

US 2004/0029609 A1 Feb. 12, 2004

Related U.S. Application Data

(60) Provisional application No. 60/376,465, filed on Apr. 29, 2002.

(51) Int. Cl.
H04B 1/00 (2006.01)

(52) U.S. Cl. ...................................... 375/147; 375/149
(58) Field of Classification Search ................ 375/147, 375/349, 347, 316, 348, 267, 346, 285, 148, 375/144, 130, 140, 145, 149, 367
See application file for complete search history.

(56) References Cited

U.S. PATENT DOCUMENTS

| | | | | |
|---|---|---|---|---|
| 5,192,957 A | * | 3/1993 | Kennedy | ................ 342/357.12 |
| 5,414,729 A | | 5/1995 | Fenton | |
| 5,574,721 A | * | 11/1996 | Magill | ......................... 370/342 |
| 5,659,573 A | * | 8/1997 | Bruckert et al. | ............. 375/142 |
| 5,818,887 A | * | 10/1998 | Sexton et al. | ................ 375/355 |
| 6,272,168 B1 | | 8/2001 | Lomp et al. | |
| 6,693,951 B1 | * | 2/2004 | Gilhousen et al. | .......... 375/130 |
| 2002/0009064 A1 | | 1/2002 | Blessent et al. | |
| 2002/0018518 A1 | | 2/2002 | Subramanian et al. | |
| 2002/0101912 A1 | * | 8/2002 | Phelts et al. | ................. 375/148 |
| 2003/0081703 A1 | * | 5/2003 | Kawaguchi et al. | ......... 375/347 |

FOREIGN PATENT DOCUMENTS

| | | |
|---|---|---|
| JP | 10-294717 | 11/1998 |
| JP | 11-150524 | 6/1999 |
| JP | 2001-069039 | 3/2001 |
| JP | 2002-111537 | 4/2002 |
| WO | 96/21294 | 7/1996 |
| WO | 97/28608 | 8/1997 |
| WO | 99/23770 | 5/1999 |

OTHER PUBLICATIONS

Gardner et al. "Interpolation in Digital Modems-Part I: Fundamentals." IEEE Transactions on Communications, vol. 41, No. 3, Mar. 1993, pp. 501-507.

(Continued)

Primary Examiner—Jean B. Corrielus
(74) Attorney, Agent, or Firm—Volpe and Koenig, P.C.

(57) ABSTRACT

A simple and robust CTL is used for time tracking of multipath components of a spread spectrum signal transmitted over a wireless multipath fading channel. A digital code-tracking loop includes the implementations of despreading early and late data samples by use of a pseudonoise sequence, an error signal output generated by the despreading, and adjustment for a plurality of on-time, early and late samples, a data rate of a control signal provided as a fractional proportion of a data rate of error signals.

34 Claims, 5 Drawing Sheets

OTHER PUBLICATIONS

Erup et al. "Interpolation in Digital Modems-Part II: Implementation and Performance." IEEE Transactions on Communications, vol. 41, No. 6, Jun. 1993, pp. 998-1008.

De Gaudenzi et al. "A Digital Chip Timing Recovery Loop for Band-Limited Direct-Sequence Spread-Spectrum Signals." IEEE Transactions on Communications, vol. 41, No. 11, Nov. 1993, pp. 1760-1769.

Hart et al. "Performance Degradation Due to Code Tracking Errors in Spread-Spectrum Code-Division Multiple-Access Systems." IEEE Journal on Selected Areas in Communications, vol. 14, No. 8, Oct. 1996, pp. 1669-1679.

De Gaudenzi et al. "Direct-Sequence Spread-Spectrum Chip Tracking in the Presence of Unresolvable Multipath Components." IEEE Transactions on Vehicular Technology, vol. 48, No. 5, Sep. 1999, pp. 1573-1583.

* cited by examiner

US 7,372,892 B2

SIMPLE AND ROBUST DIGITAL CODE TRACKING LOOP FOR WIRELESS COMMUNICATION SYSTEMS

CROSS REFERENCE TO RELATED APPLICATION(S)

This application claims priority from U.S. Provisional Application No. 60/376,465, filed Apr. 29, 2002, which is incorporated by reference as if fully set forth.

FIELD OF INVENTION

The present invention relates to the field of wireless communications. More specifically, the present invention relates to an improved code tracking system and method for the field of spread spectrum communication systems.

BACKGROUND

Code division multiple access (CDMA) technology has been widely used in mobile cellular phone systems. One of the advantages of CDMA technology is that it is very robust in scenarios where multiple-path fading may be experienced. A rake receiver, which is commonly used for CDMA reception, consists of a bank of correlators and a combiner. Each correlator, or rake finger, is used to separately detect and demodulate one of the strongest multipath components (fingers) of the wideband fading channel and the combiner combines all correlator outputs to obtain the combined energy from these strongest multipath components. Since the number of the multipath signals and their positions vary in time, time tracking of each multipath component is required. For this timing tracking, a code-tracking loop (CTL), also called delay lock loop (DLL), is usually used. In previous CTL designs, either a voltage controlled oscillator (VCO) or a numerically controlled oscillator (NCO) was used. A CTL may be either coherent or noncoherent. Coherent and non-coherent relate to how the despread data is summed to generate an error signal.

SUMMARY

According to the present invention, a simple and robust code-tracking loop (CTL) is used for time tracking of multipath components of a spread spectrum signal transmitted over a wireless multipath fading channel. The CTL includes despreading early and late data samples using a pseudonoise sequence, outputting an error signal by the despreading, adjusting for a plurality of on-time, early and late samples, and determining a data rate of a control signal as a fractional proportion of a data rate of error signals. The CTL has a simple structure to implement. A joint CTL is also disclosed for canceling interference between two multipaths when two multipaths are very close to each other.

DETAILED DESCRIPTION OF THE PREFERRED EMBODIMENTS

Figure 1:
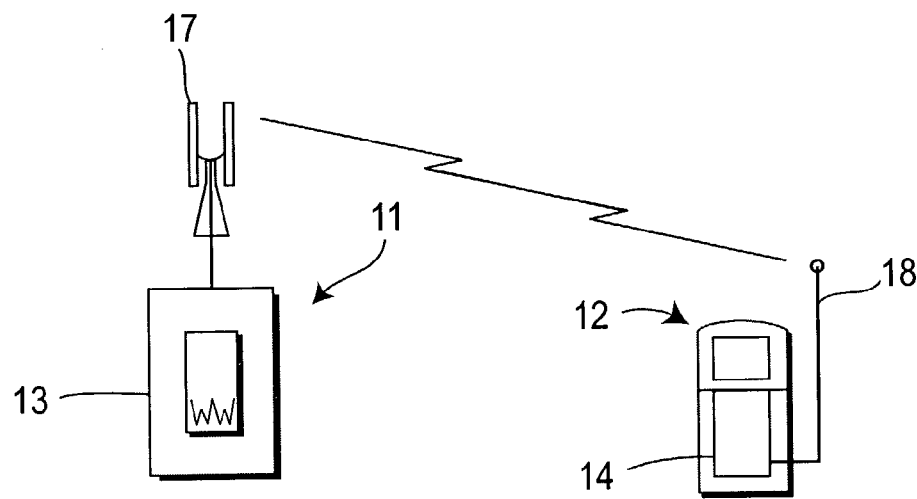
FIG. 1 is a diagram of a wireless communications link.

The present invention will be described with reference to the drawing figures wherein like numerals represent like elements throughout.

FIG. 1 is a diagram of a wireless communications link, which includes one or more base stations 11 (only one shown for simplicity) and one or more wireless transmit and receive units (WTRUs) 12 (only one shown for simplicity). The base station includes a transmitter (not shown) and receiver 13, and the WTRU 12 includes a transmitter (not shown) and receiver 14. At least one of the base stations 11 and WTRU 12 have transmit functions so that a communications link is established between the base station 11 and the WTRU 12, as represented by antennas 17, 18. It should be understood by those skilled in the art that the CTL 21 of the present invention is implemented within a receiver, such as receiver 13 or 14.

A CTL uses the early and late signals (i.e. samples) to generate an error signal for timing tracking. The early and late samples are defined as the samples that are a half chip (half chip interval) earlier and a half chip (half chip interval) later than the on-time sample, respectively. A "chip" is a time interval to transmit one bit of spreading code and a half chip is half the time interval of a chip interval. The frequency of a chip time interval is called the "chip rate." In UMTS CDMA and CDMA2000 standards, the chip rate is defined as 3.84 MHz/s.

Figure 2:
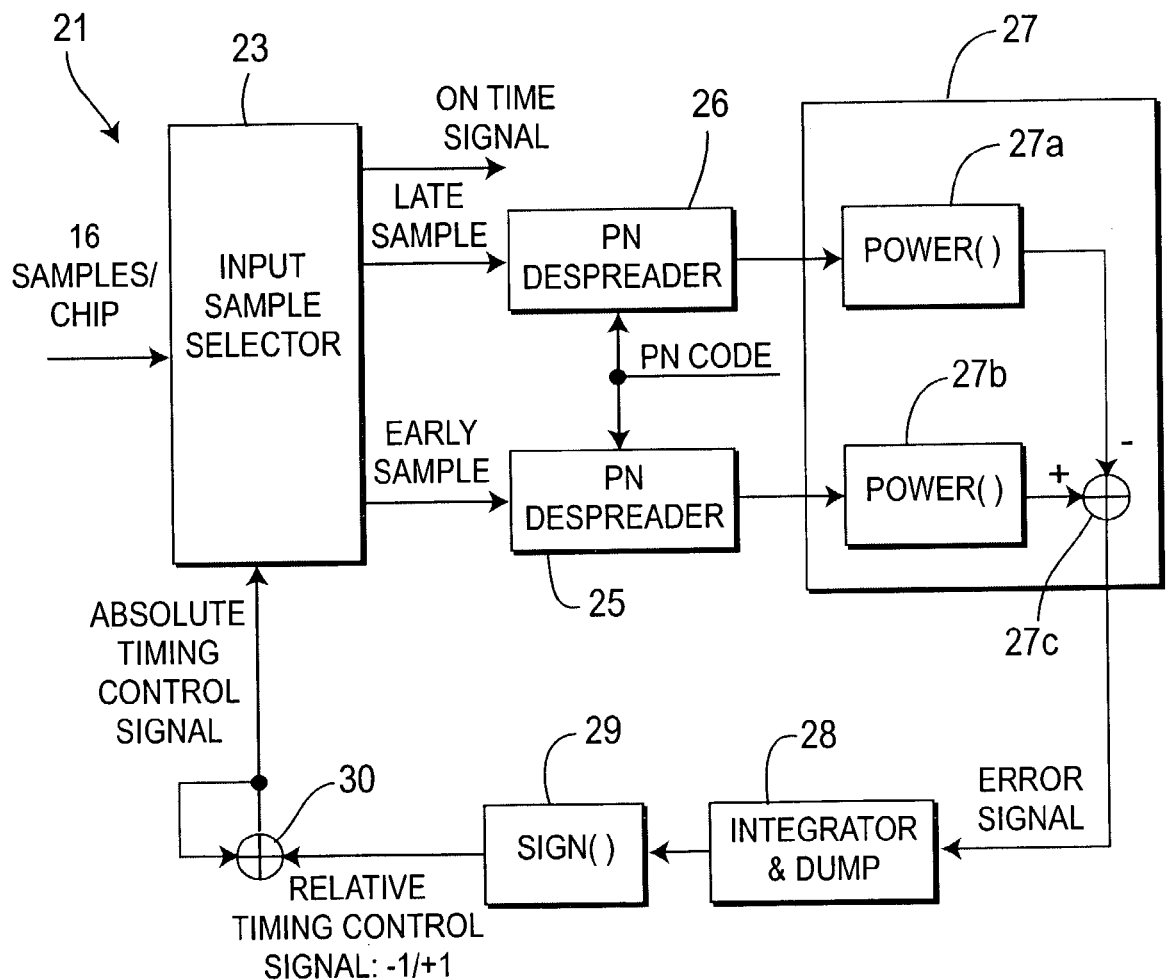
FIG. 2 is a block diagram of CTL using high sampling input data.

Referring to FIG. 2, a block diagram of a CTL 21 in accordance with the present invention is shown. The inputs are data samples with the sampling rate of 16 times the chip rate. It should be noted that although specific data rates are set forth herein, these data rates are provided by way of example only. For example, although data sample rates may vary, sampling rates of 8 and 16 are typical sample rates. In another example using 16 times the rate of sampling, for every 16 samples one of the samples will be an "on-time" synchronized sample which will be used for despreading, demodulation and rake combining. The CTL 21 will track this timing and select the on-time sample. To achieve this goal, the CTL 21 will use early and late samples.

CTL 21 includes an input sample selector 23, an early sample pseudonoise (PN) despreader 25, a late sample PN despreader 26, an early-late detector 27, an integration and dump circuit 28, a sign calculator 29 and a summer 30. The input sample selector 23 provides early and late samples to the PN despreaders 25, 26 which, in turn, provide signals to the early-late detector 27. The early-late detector 27 includes a late power calculator 27a, an early power calculator 27b and a summer 27c. The output of the early-late detector 27 is an error signal which is provided to the integrator and dump circuit 28. The output of the integrator and dump circuit 28 is sent to the sign calculator 29. The sign calculator 29 outputs a ±1 signal that is input to the summer 30. The summer 30 converts the relative timing control signal (i.e. −1/+1) to an absolute timing control signal taking into account previous results. The output of the summer 30 is sent to the input sample selector 23 to form the loop.

The integration function that is performed by the integrator in the integration and dump circuit 28 accumulates the signal power and to improve the signal-to-noise ratio. After the signal is integrated for a defined or predetermined period of time, the integration value is output. In order to integrate the signal for the next time period, the signal in the integrator is first cleared. Accordingly, the procedure in which the integrator integrates signal discontinuously between different periods of time is called "integration and dump." The integration interval is selected to be a pilot symbol interval. In a preferred embodiment, the pilot symbol interval is a predetermined number of chips, which in the exemplary embodiment is 256 chips.

The CTL 21 operates by first despreading the early samples and the late samples. The early and late samples are despread by a PN sequence that is known to the receiver. The despread data is denoted as $S_e(k)$ and $S_l(k)$ for early and late samples respectively, where $S_e(k)$ and $S_l(k)$ are complex numbers, and k represents kth data in the time domain. The early-late detector 27 uses despread data, or data symbols, to generate an error signal, which can be obtained noncoherently using Equation (1):

$$E_r(k) = |S_e(k)|^2 - |S_l(k)|^2. \quad \text{Equation (1)}$$

For each N error signals $E_r(k)$, where (N>1), a control signal $C_0$ will be generated according to the sign of the sum of these N error signals $E_r(k)$, which can be expressed as:

$$C_0 = \text{sign}\left\{\sum_{k=1}^{N} E_r(k)\right\}. \quad \text{Equation (2)}$$

This control signal $C_0$ is used to adjust all on-time, early and late samples either forward or backward by M samples. Typically the adjustment is M=1 or 2, or M/16 chip, which is typically 1/16 chip or 1/8 chip. The data rate of this control signal $C_0$ is therefore N times lower than the data rate of error signals $E_r(k)$.

Still referring to FIG. 2, in some instances the transmitted data can be estimated. If this is the case (i.e., the transmitted data can be estimated), this is done by first removing the modulated data is from the despread early signal and despread late signal. This results in:

$$S_e(k)^*\alpha(k)^* \text{and} \quad \text{Equation (3)}$$

$$S_l(k)^*\alpha(k)^*, \text{respectively,} \quad \text{Equation (4)}$$

where $\alpha(k)$ is the transmitted symbol or an estimate of transmitted signal, and ( )* represents the conjugate. Thereafter, $N_l$ despread early and late signals with data removed are coherently summed to calculate the error signal Er(k) that can be expressed by:

$$E_r(k) = \left|\sum_{k=1}^{N_1} S_e(k)a(k)^*\right|^2 - \left|\sum_{k=1}^{N_1} S_l(k)a(k)^*\right|^2. \quad \text{Equation (5)}$$

The despread data $S_e(k)$ or $S_l(k)$ contains a demodulating symbol a(k) that is {-1,+1} for BPSK modulation or {-1,+1,-j,+j} for QPSK modulation. When the despread data $S_e(k)$ or $S_l(k)$ is multiplied with the conjugate of a(k) as in Equations (3) and (4), the a(k) component in the despread data $S_e(k)$ or $S_l(k)$ will be "removed."

The data rate of the error signal $E_r(k)$ is $N_l$ times lower than that of the despread early or late signal since every $N_l$ despread early or late signal generates one error signal. For every N error signals $E_r(k)$, where N>1, a control signal $C_0$ is generated according to the sign of the sum of these N error signals, and the data rate of this control signal $C_0$ is $N_1 \times N$ times lower than the data rate of error signals.

In either case, the error signal $E_r(k)$ is generated. Equation (1) uses one despread data symbol to generate one error signal $E_r(k)$. Equation (5) uses $N_l$ despread data symbols to generate one error signal $E_r(k)$. Therefore the data rates of the error signals $E_r(k)$ are different by $N_l$ times.

According to one embodiment of the present invention, both coherent and non-coherent approaches are used. Coherent detection adds signals coherently (i.e. sum the complex numbers directly) such as the sums in Equation 5 (or as will be explained in detail hereafter, the inner sum in Equation 7). Noncoherent detection adds signals noncoherently (i.e. sum the power of complex numbers) such as the sum which will be explained with reference to Equation 6. The difference between the two approaches is that coherent detection has better performance than noncoherent detection. However, in order to use coherent detection to obtain better performance, the transmitted signal a(k) has to be known or estimated as performed in Equation 5.

Figure 3:
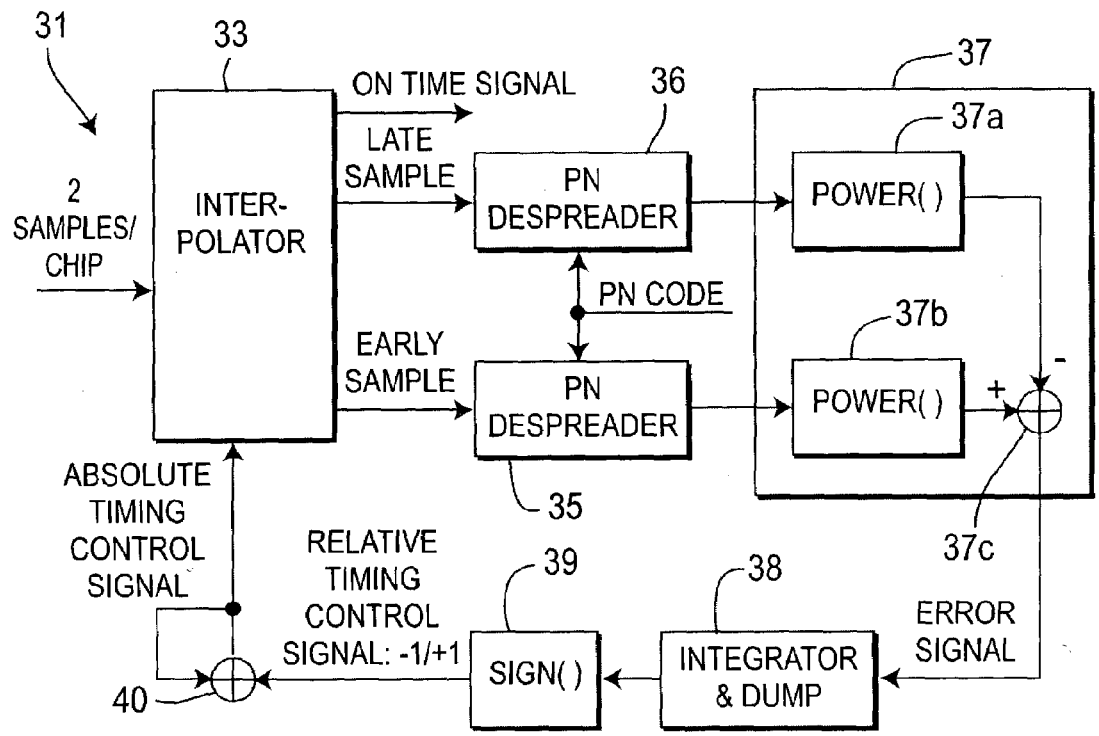
FIG. 3 is a block diagram of CTL using low sampling rate input data.

A second embodiment of a CTL 31 in accordance with the present invention using low sampling rate input data is shown in FIG. 3. This CTL 31 includes an interpolator 33, an early sample PN despreader 35, a late sample PN despreader 36, an early-late detector 37, an integration and dump circuit 38, a sign calculator 39 and a summer 40. The interpolator 33 provides early and late samples to the PN despreaders 35, 36, which in turn provide signals to the early-late detector 37. The early-late detector 37 includes a late signal power calculator 37a, an early signal power calculator 37b, and a summer 37c. The output of the early-late detector 37 is an error signal $E_r(k)$ which is provided to the integrator and dump circuit 38. The output of the integrator and dump circuit 38 is sent to the sign calculator 39.

The sign calculator 39 outputs a ±1 signal that is supplied to the summer 40. The summer 40 converts the relative timing control signal (i.e. −1/+1) to an absolute timing control signal taking into account previous results. The output of the summer 40 is sent to the interpolator 33 to form the loop in the same manner as depicted in FIG. 2.

For low sampling rate input data, the sampling rate is typically two samples per chip. In order to adjust the timing for on-time and early/late samples forward or backward by a fraction of chip (for example 1/16 chip or 1/8 chip), the interpolator 33 is used to generate all on-time samples, and early/late samples which are offset by such amount of time from the previous samples.

As can be seen, the input data rates are different for the input sample selector 23 shown in FIG. 2 and the interpolator 33 shown in FIG. 3. The sample selector 23 selects which input samples to use according to the control signal $C_0$. Since the interpolator 33 has only two input samples per chip, it has to regenerate or interpolate the desired samples according to a control signal input.

The CTL 21 of FIG. 2 requires a high-speed analog-to-digital converter (ADC). The CTL 31 of FIG. 3 uses a low-speed ADC, which is lower in cost, but CTL 31 also requires an extra interpolator to regenerate the desired samples. With CTL 21, a high data rate (i.e. 16 samples/ chip) is used and therefore a high speed ADC is required. With CTL 31, a low data rate (i.e. 2 samples/chip) is used and therefore a low speed ADC is required. The different data rates are needed for different applications. For example, in FIG. 4, a low speed ADC is preferred because is uses 2 samples/chip and interpolator 53.

In an exemplary embodiment corresponding to the UMTS FDD standard, for uplink transmissions every slot of the dedicated physical control channel contains ten symbols (including pilot, transmit power control and TFCI bits). Among these ten symbols, pilot symbols are known to the receiver, but the power control and TFCI bits are unknown to the receiver. Suppose that $SE_{k,j}$ and $SL_{k,j}$ denote the despread early and late signals for the jth symbol in the kth slot. If the CTL 31 is updated every two frames (there are 15 slots per frame and 30 slots per two frames), then the control signal $C_0$ at the output of the integration and dump circuit 38 using noncoherent combining can be expressed as:

$$C_0 = \text{SIGN}\left\{\sum_{k=1}^{30}\sum_{j=1}^{10}\{|SE_{k,j}|^2 - |SL_{k,j}|^2\}\right\}. \quad \text{Equation (6)}$$

Alternatively CTL 31 coherently sums a number of early and late signals from one slot, and then calculates the power and the error signal $E_r(k)$. Again if the CTL 31 is updated every two frames, then the control signal C0 at the integrator output can be expressed as:

$$C_0 = \text{SIGN}\left\{\sum_{k=1}^{30}\left\{\left|\sum_{j=1}^{N_1} SE_{k,j}a_{k,j}^*\right|^2 - \left|\sum_{j=1}^{N_1} SL_{k,j}a_{k,j}^*\right|^2\right\}\right\}; \quad \text{Equation (7)}$$

where $\alpha_{k,j}$ is the known pilot bit or the estimated power control/TFCI bit in the jth symbol of the kth slot.

Figure 4:
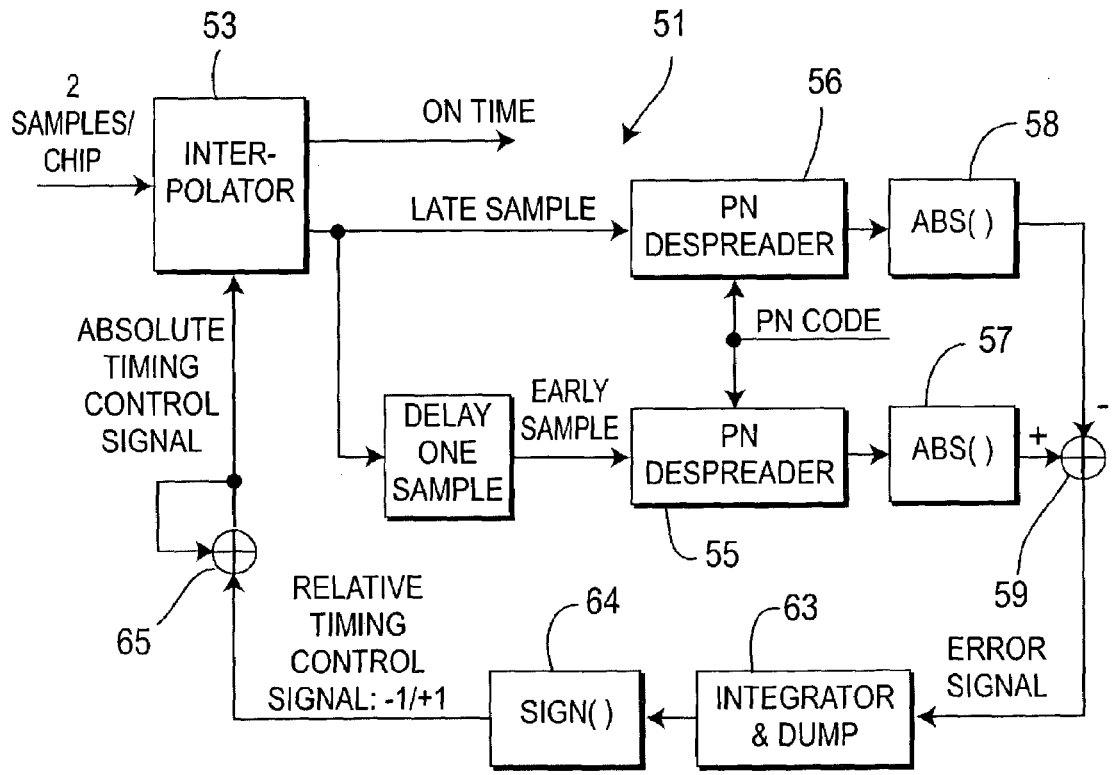
FIG. 4 is a block diagram of one CTL design for UMTS FDD system.

Some further alternatives are possible by implementing various combinations of the following items: 1) using an input sample selector 23 (for the high speed ADC as shown in FIG. 2) or interpolator 33 (for the low speed ADC as shown in FIG. 3); 2) using a noncoherent error signal calculation as in Equations 1 and 6 or using coherent error signal calculation as in Equations 5 and 7; and 3) using error signal power as in Equations 1–5, 6 and 7 or using error signal absolute value as in Equation 9. As explained above, FIG. 2 uses an input sample selector, noncoherent error signal calculation, and error signal power (Equation 1) and FIG. 3 uses an interpolator, noncoherent error signal calculation and error signal power (Equation 1). FIG. 4, explained below, uses an interpolator, noncoherent error signal calculation and error signal absolute value.

As explained above Equations (6) and (7) represent two different methods to generate the error signal $E_r(k)$ as explained above. Equation (6) uses noncoherent detection and uses the error signal generation in Equation (1), and Equation (7) uses coherent detection and uses the error signal generation in Equation (5). The "SIGN" is used to adjust the timing forward or backward. When the sign of Equations (6) or (7) is positive, it will adjust the timing backward; whereas when the sign of Equations (6) or (7) is negative, it will adjust the timing forward.

An embodiment of a CTL for UMTS FDD in accordance with the present invention is shown in FIG. 4. The CTL circuit 51 includes an interpolator 53, a delay circuit 54, early and late PN despreaders 55, 56, two magnitude calculation circuits 57, 58 which calculate absolute values of the respective signals, and a summer 59. Also included is an integrator and dump circuit 63, a sign calculator 64 and a second summer 65. The interpolator 53 provides a single early/late output to delay circuit 54, which provides an early signal to early PN despreader 55. The output of interpolator 53 is provided directly to late PN despreader 56 and the outputs of the despreaders 55, 56 are provided to respective magnitude calculation circuits 57, 58.

The circuit of FIG. 4 uses the first error signal generation method described by Equations (1) and (6) because the early sample and late sample are separated by exactly one chip interval, and the early sample can be obtained from late sample by delaying one sample. Further, in FIG. 4, the square calculation performed by the early and late signal power calculators 37a, 37b is replaced with an absolute value calculation in order to simplify the hardware complexity.

If one compares Equation (9) with Equation (1), it will be noted that the integrator and dump circuit 63 performs the summing as described in Equation (6); and the sign calculator 64 resolves the sign (+ or −) as described in Equation (6). Since this sign generates a relative timing adjustment, a new absolute timing signal is generated by summing the previous absolute timing with the incoming relative adjustment. This is done in summer 65.

The absolute values (of the early and late despreaders 55, 56 calculated in the magnitude calculation circuits 57, 58) are provided to the summer 59, which provides an error signal $E_r(k)$ as its output to the integrator and dump circuit 63 which and, in turn, outputs to the sign calculator 64. The output from the sign calculator 64 hard limited to a ±1 signal, which is supplied as a phase control signal to the interpolator 53, to form the loop.

The error signal $\Delta_{k,j}$ is the difference of the absolute values of $E_{k,j}$ and $L_{k,j}$, which can be expressed as:

$$\Delta_{k,j}=|E_{k,j}|-|L_{k,j}| \quad \text{Equation (9)}$$

The integrator and dump circuit 63 provides the magnitude of the error signals and its output is hard-limited by the sign calculator 64 to either +1 or −1 according to the sign of the summed error signals. This +1 or −1 is used to adjust the timings of all punctual, early and late samples by ⅛ chip forward or backward and is implemented by controlling the interpolator phase. This interpolator phase is updated by subtracting the previous phase with the new input data (+1 or −1).

The interpolator 53 uses four samples (with the sampling interval of a half chip) to generate the punctual and late samples. The relationship between the phase control signal (i.e. the interpolator output), the timing offset and the interpolator coefficients is shown in Table 1. The early sample is generated by delaying one sample of the previously generated late sample. If the punctual sample is on phase "0," then the late sample will be on the phase "2." If the punctual sample is on phase "x," then the late sample will be on phase "x+2."

TABLE 1

Interpolator Phase, Timing Offset and Coefficients.

| Interpolator Phase | timing offset (chips) | coefficient 1 | coefficient 2 | coefficient 3 | coefficient 4 |
|---|---|---|---|---|---|
| −6 | −0.7500 | 0.0000 | 0.0000 | 0.0000 | 1.0000 |
| −5 | −0.6250 | 0.0547 | −0.2578 | 0.6016 | 0.6016 |
| −4 | −0.5000 | 0.0625 | −0.3125 | 0.9375 | 0.3125 |
| −3 | −0.3750 | 0.0391 | −0.2109 | 1.0547 | 0.1172 |
| −2 | −0.2500 | 0.0000 | 0.0000 | 1.0000 | 0.0000 |
| −1 | −0.1250 | −0.0391 | 0.2734 | 0.8203 | −0.0547 |

TABLE 1-continued

Interpolator Phase, Timing Offset and Coefficients.

| Interpolator Phase | timing offset (chips) | coefficient 1 | coefficient 2 | coefficient 3 | coefficient 4 |
|---|---|---|---|---|---|
| 0 | 0.0000 | −0.0625 | 0.5625 | 0.5625 | −0.0625 |
| 1 | 0.1250 | −0.0547 | 0.8203 | 0.2734 | −0.0391 |
| 2 | 0.2500 | 0.0000 | 1.0000 | 0.0000 | 0.0000 |
| 3 | 0.3750 | 0.1172 | 1.0547 | −0.2109 | 0.0391 |
| 4 | 0.5000 | 0.3125 | 0.9375 | −0.3125 | 0.0625 |
| 5 | 0.6250 | 0.6016 | 0.6016 | −0.2578 | 0.0547 |
| 6 | 0.7500 | 1.0000 | 0.0000 | 0.0000 | 0.0000 |

The integrator and dump circuit 63 is reset every 30 slots during steady tracking mode, and is reset every ten slots during the initial pull-in mode. At the beginning, the CTL 51 is in a "rough" timing position. It is desirable for CTL 51 to react quickly to find the right timing position (initial pull-in mode), and then the CTL 51 will lock to this position and track any timing change (tracking mode). During the first five minutes after the finger is assigned to the CTL 51, the CTL 51 is assumed to be in the pull-in mode, and from the sixth frame on, the CTL 51 is assumed to be in the tracking mode.

For the pull-in mode, the CTL 51 is updated every ten slots and all ten pilot and data symbols are used per dedicated physical control channel (DPCCH) slot. In this case the accumulator output Q can be expressed as:

$$Q = \text{SIGN}\left\{\sum_{k=1}^{10}\sum_{j=1}^{10} \Delta_{k,j}\right\}. \qquad \text{Equation (10)}$$

For steady mode, the CTL 51 is updated every 30 slots (or two frames) and all ten pilot and data symbols are used per DPCCH slot. The integrator and dump circuit output 63 can be expressed as:

$$Q' = \text{SIGN}\left\{\sum_{k=1}^{30}\sum_{j=1}^{10} \Delta_{k,j}\right\}. \qquad \text{Equation (11)}$$

Simulations of the results of CTL 51 tracking during a steady mode were performed. The simulation parameters were as follows:
1) Both time and frequency drift is 0.613 ppm;
2) The channel is AWGN channel;
3) Target SNR=−24 dB;
4) The CTL 51 is updated every two frames (30 slots);
5) For each CTL 51 updating, ⅛ chip forward or backward adjustment is applied;
6) The maximum timing error is calculated;
7) The root-square of mean square timing error (RMSE) is calculated;
8) Both noncoherent and coherent combining are considered;
9) For noncoherent combining, ten symbols per slot are used, and the error signal calculation is same as Equation (6);
10) For coherent combining, only three pilot symbols per slot are used, and the error signal calculation is same as Equation (7) with N1=3;
11) A simplified scheme is simulated, which uses the absolute value instead of power of early and late signals.

Figure 5:
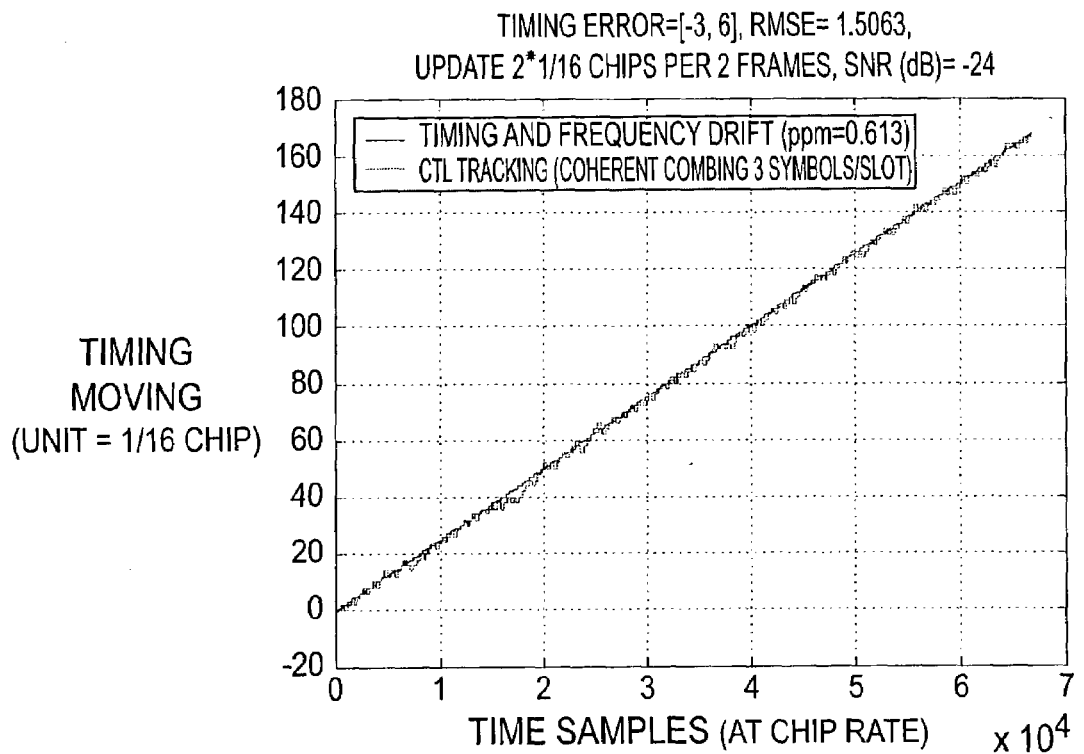
FIG. 5 is a graph showing simulated timing tracking at signal to noise ratio SNR=−24 dB.
Figure 6:
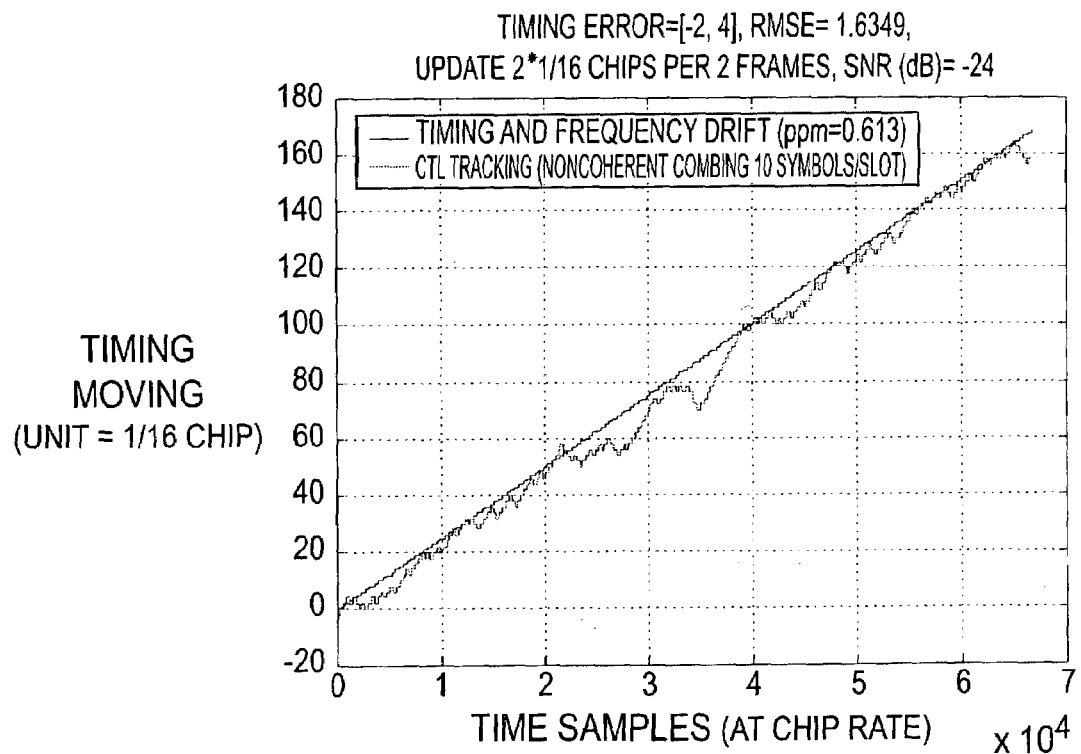
FIG. 6 is a graph showing simulated timing tracking at SNR=−24 dB.

FIG. 5 is a graph showing simulated timing tracking at SNR=−24 dB using coherent detection. By applying Equation (7), a noncoherent combining of ten pilot symbols per slot is achieved. FIG. 6 is a graph showing simulated timing tracking at SNR=−24 dB using non-coherent detection.

Figure 7:
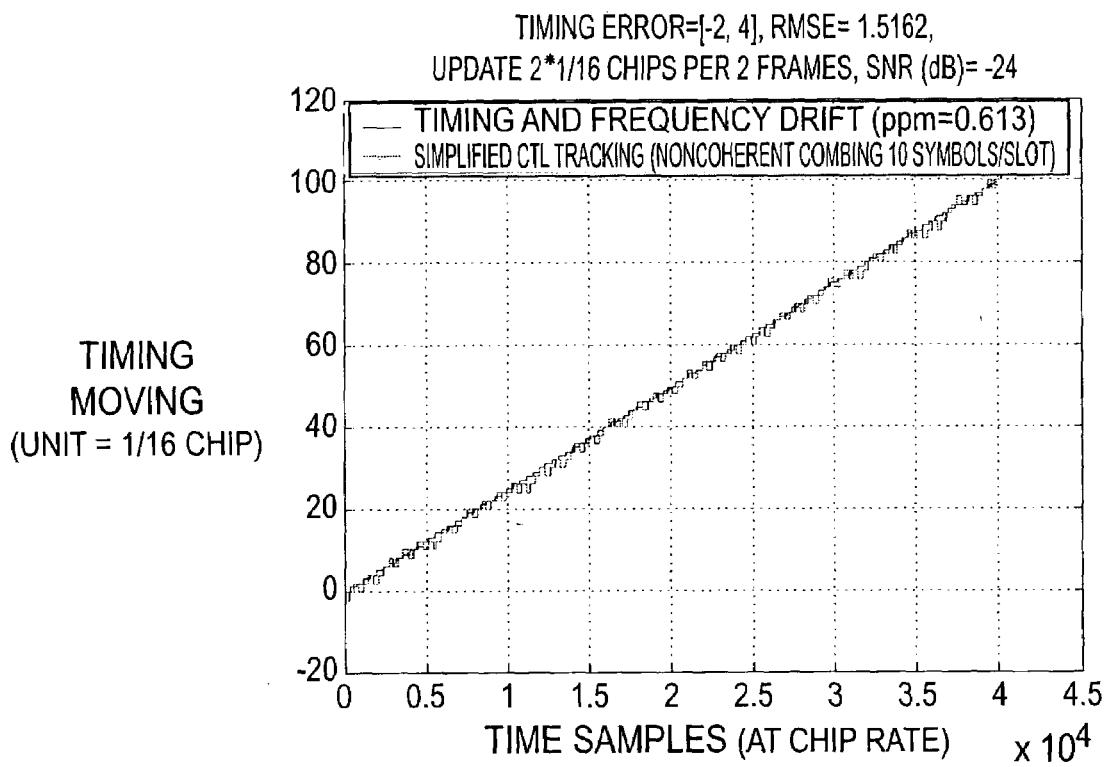
FIG. 7 is a graph showing simulated timing tracking at SNR=−24 dB.

FIG. 7 shows the results of a simplified error signal calculation in accordance with the present invention using Equation (11). Since the error signal calculation in both Equation (6) for noncoherent combining and Equation (7) for coherent combining need to calculate the power of complex numbers, this power calculation is very complicated in a hardware implementation. In order to reduce the hardware complexity, the magnitude calculation is used instead of the power calculation.

If all ten pilot and data symbols are used for noncoherent combining in each slot and the CTL is updated every two frames (30 slots), then the accumulator output can be expressed as:

$$Q'' = \text{SIGN}\left\{\sum_{k=1}^{30}\sum_{j=1}^{10} \{|E_{k,j}| - |L_{k,j}|\}\right\}. \qquad \text{Equation (12)}$$

If only first three pilot symbols are used for coherent combining in each slot and the CTL is updated every two frames (30 slots), then the accumulator output can be expressed as:

$$Q = \text{SIGN}\left\{\sum_{k=1}^{30}\left\{\left|\sum_{j=1}^{3} E_{k,j}\right| - \left|\sum_{j=1}^{3} L_{k,j}\right|\right\}\right\}. \qquad \text{Equation (13)}$$

Table 2 is a set of performance comparisons of the RMSE of difference CTL schemes. In this table, three CTL schemes were compared. One is the noncoherent combining using ten symbols per slot; the second is the coherent combing using three pilot symbols per slot; and the third is the simplified noncoherent combining using ten symbols per slot. For the target SNR=24 dB, the three schemes perform closely. When the SNR is −34 dB, the coherent combining performs worst because fewer symbols are used. The simplified scheme is worse than the non-simplified version.

TABLE 2

The RMSE of difference CTL schemes

| | Noncoherent combining using 10 symbols per slot | Coherent combining using 3 symbols per slot | Simplified noncoherent combining using 10 symbols per slot |
|---|---|---|---|
| SNR = −24 dB | 1.63 | 1.51 | 1.52 |
| SNR = −30 dB | 2.18 | 2.27 | 2.17 |
| SNR = −34 dB | 3.07 | 5.15 | 4.03 |

Each CTL tracks one finger independently. When two multipaths (or fingers) are within one and half chip, the two CTLs for the two fingers will interfere with each other and therefore degrades the CTL tracking performance. According to a particular aspect of the invention, a joint CTL scheme is used to reduce the interference from each other. Without loss of generality, it is possible to take an approach that there are two multipaths. The received signal r(t) can be expressed as $$r(t) = h_1(t)s(t) + h_2(t)s(t-\tau) \quad \text{Equation (14)}$$

where s(t) is the useful signal, $$s(t) = \sum_{k=-\infty}^{\infty} a_k g(t - kT),$$

$a_k$ is the information symbol and g(t) is the signal waveform. $h_1(t)$ is the channel gain of the first path and $h_2(t)$ is the channel gain of the second path. $\tau$ is the relative delay between the two fingers. Note that the additive white Gaussian noise is not considered in Equation (14).

Figure 8:
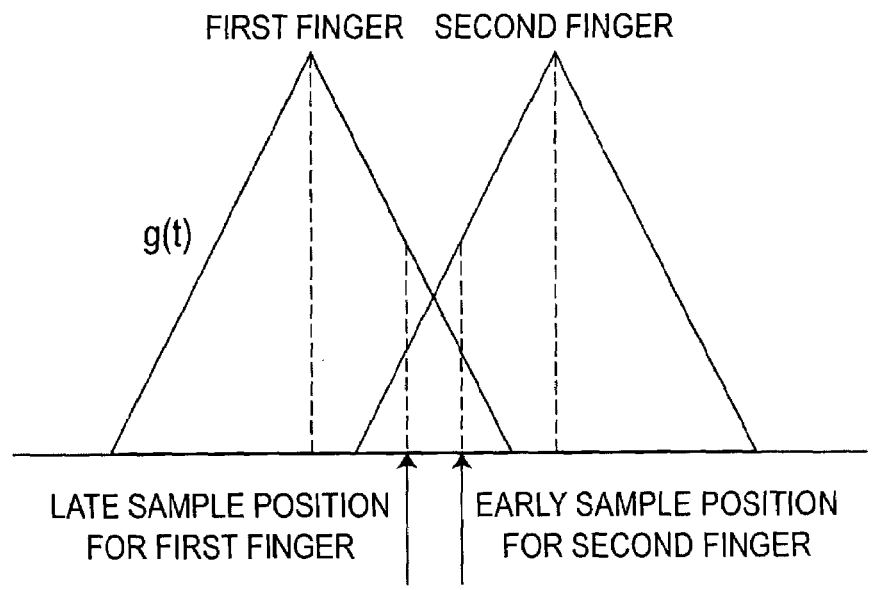
FIG. 8 is a graph showing the interference between two adjacent CTLs when they are separated by less than one and half chip.

When the relative delay between two adjacent fingers is less than 1.5 chip, the two independent CTLs will interfere with each other as shown in FIG. 8. It should be noted that triangle waveform is used for demonstration only and is not necessarily used in practice. Due to the interference, the performance of the two CTLs will degrade. The sample of the late signal of the first finger will contain the interference $h_2 g(\tau-T/2)$ from the second finger, and the sample of the early signal of the second finger will contain the interference $h_1 g(\tau-T/2)$ from the first finger. The sample of the late signal of the first finger $S_l^{1st}(k)$ is:

$$S_l^{1st}(k) = h_1(k)g(T/2) + h_2(k)g(\tau - T/2) \quad \text{Equation (15)}$$

and the sample of the early signal of the second finger $S_e^{2nd}(k)$ is:

$$S_e^{2nd}(k) = h_1(k)g(\tau - T/2) + h_2(k)g(T/2). \quad \text{Equation (16)}$$

Figure 9:
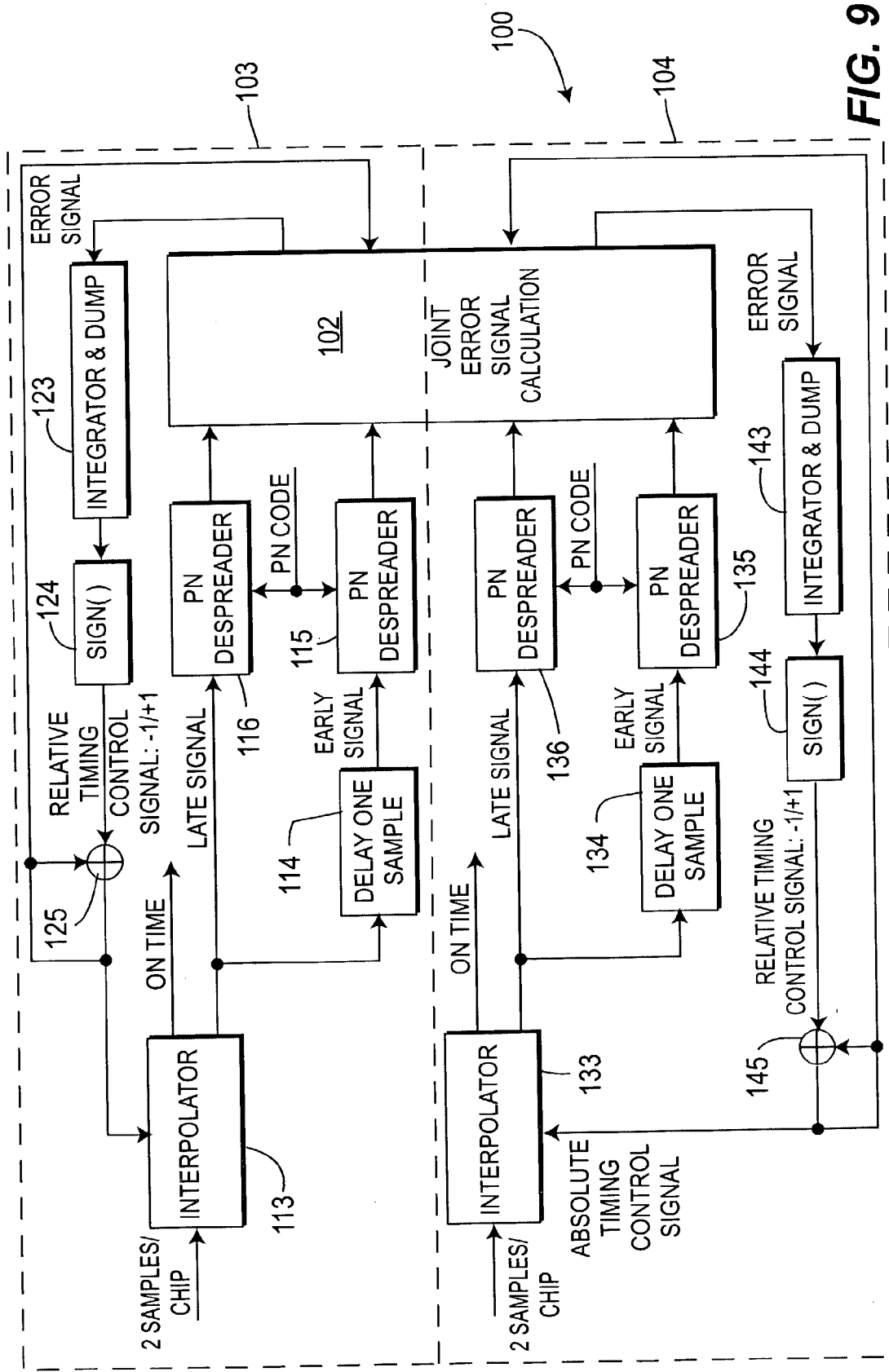
FIG. 9 is a block diagram of joint CTL scheme.

FIG. 9 is a block diagram of joint CTL scheme 100. The components are similar to FIG. 4, but with a joint error signal calculator 102 operating as part of two CTL circuits 103, 104.

CTL circuit 103 includes an interpolator 113, a delay circuit 114, early and late PN despreaders 115, 116, to magnitude calculation circuits 117, 118 which calculate absolute values of the respective signals, and to a summer 119. Also included is an integrator and dump circuit 123, a sign calculator 124, and a second summer 125. The interpolator 113 provides a single early/late output to delay circuit 114, which provides an early signal to early PN despreader 115. The output of interpolator 113 is provided directly to late PN despreader 116 and the outputs of the despreaders 115, 116 are provided to respective magnitude calculation circuits 117,118. CTL circuit 104 includes an interpolator 133, a delay circuit 134, early and late PN despreaders 135, 136, to magnitude calculation circuits 137, 138 which calculate absolute values of the respective signals, and to a summer 139. Also included is an integrator and dump circuit 143, a sign calculator 144, and a second summer 145. The interpolator 133 provides a single early/late output to delay circuit 134, which provides an early signal to early PN despreader 135. The output of interpolator 133 is provided directly to late PN despreader 136 and the outputs of the despreaders 135, 136 are provided to respective magnitude calculation circuits 137, 138.

As can be seen, the relative delay $\tau$ between the two fingers can be obtained from two CTLs. As is the case with the circuit of FIG. 4, the circuit of FIG. 9 uses the first error signal generation method-described by Equations (1) and (6) because the early sample and late sample are separated by exactly one chip interval and the early sample can be obtained from late sample by delaying one sample. An absolute calculation is used in order to simplify the hardware complexity.

According to particular aspects of the present invention, the following two methods are effective to cancel interference:

Method 1: If the channel gains $h_1(t)$ and $h_2(t)$, are known, the inference is cancelled by subtracting the interference from useful signal. The error signals are generated as $$E_r^{1st}(k) = |S_e^{1st}(k)|^2 - |S_l^{1st}(k) - h_2(k)g(\tau - T/2)|^2 \quad \text{Equation (17)}$$

$$E_r^{2nd}(k) = |S_e^{2nd}(k) - h_1(k)g(\tau - T/2)|^2 - |S_l^{2nd}(k)|^2 \quad \text{Equation (18)}$$

The control signal $C_0$ is calculated using Equation (2).

Method 2: If the channel gains $h_1$ and $h_2$ are not known, but the power of the two fingers is known, which are the means of the channel gains $|h_1|^2$ and $|h_2|^2$, $E|h_1|^2$ and $E|h_2|^2$. Since:

$$\frac{1}{N}\sum_{k=1}^{N}|S_l^{1st}(k)|^2 = E|h_1|^2 g^2(T/2) + E|h_2|^2 g^2(\tau - T/2) \quad \text{Equation (19)}$$

$$\frac{1}{N}\sum_{k=1}^{N}|S_e^{2nd}(k)|^2 = E|h_1|^2 g^2(\tau - T/2) + E|h_2|^2 g^2(T/2) \quad \text{Equation (20)}$$

The control signal $C_0$ is calculated as follows with the interference removed.

$$C_0^{1st} = \text{sign}\left\{\frac{1}{N}\sum_{k=1}^{N}|S_e^{1st}(k)|^2 - \frac{1}{N}\sum_{k=1}^{N}|S_l^{1st}(k)|^2 - E|h_2|^2 g^2(\tau - T/2)\right\}$$

Equation (21)

$$C_0^{2nd} = \text{sign}\left\{\frac{1}{N}\sum_{k=1}^{N}|S_e^{2nd}(k)|^2 - \frac{1}{N}\sum_{k=1}^{N}|S_l^{2nd}(k)|^2 - E|h_1|^2 g^2(\tau - T/2)\right\}$$

Equation (22)

The present invention is useful in cellular mobile systems. In one preferred embodiment, the invention is implemented in a base station transmission as controlled by a radio network controller or a Node B transmit controller. It is understood, however, that the invention can be used for a wide variety of spread spectrum communications transmissions.

What is claimed is:

1. A digital code-tracking loop configured for operation with wireless communications transmitted in a predetermined slotted time frame format comprising:
   a despreader configured to despread early and late data samples by use of a pseudonoise sequence;
   an early-late detector configured to generate error signals from the output of the despreader;
   a feedback loop configured to provide timing tracking for a plurality of on-time, early and late samples, and to provide an adjustment based on a sign of an accumulation of the generated error signals, but not the magnitude of the samples or error signals, using a control signal such that a data rate of the control signal is a fractional proportion of a data rate of said generated error signals and such that updated timing tracking is provided every 2 frames.

2. The digital code-tracking loop of claim 1, wherein:
   the despreader is configured to despread data samples that include early despread data samples $S_e(k)$ and late despread data samples $S_l(k)$ wherein each $S_e(k)$ and $S_l(k)$ is provided as a complex number and k represents the kth data in a time domain; and
   the early-late detector is configured to generate the error signals as $E_r(k)$ according to the following equation:

$E_r(k)=|S_e(k)|^2-|S_l(k)|^2$.

3. The digital code-tracking loop of claim 1, wherein:
   the early-late detector is configured to detect early and late samples defined as values at half chip interval earlier and half chip interval later than on-time values, respectively.

4. The digital code tracking loop of claim 3, wherein the code tracking loop is configured to select an on-time sample, used for despreading, demodulation and rake combining, for every N samples, where N equals a number of samples per chip.

5. The digital code tracking loop of claim 3, wherein:
   the despreader is configured to despread data samples from a plurality of slots of a dedicated physical control channel, each slot including 10 symbols, the 10 symbols providing pilot, transmit power control and transport format combination indicator (TFCI) bits.

6. The digital code-tracking loop of claim 1, wherein the code tracking loop is configured to provide timing tracking of multipath components of a direct sequence spread spectrum signal over a wireless multipath fading channel.

7. A radio transmission controller configured to implement a digital code-tracking loop and configured for operation with wireless communications transmitted in a predetermined slotted time frame format, the radio transmission controller comprising:
   a despreading circuit configured to despread early and late data samples by use of a pseudonoise sequence;
   an early-late detector circuit configured to generate error signals from the output of the despreading circuit;
   a circuit configured to generate control signals based on a sign but not a magnitude of an accumulation of the generated error signals at a data rate that is a fractional proportion of a data rate of said error signals; and
   a circuit configured to adjust timing tracking for a plurality of on-time, early and late samples based on said control signals, but not the magnitude of the samples or error signals such that updated timing tracking is provided every 2 frames.

8. The radio transmission controller of claim 7, wherein:
   the despreading circuit is configured to despread data samples that include early despread data samples $S_e(k)$ and late despread data samples $S_l(k)$, wherein each $S_e(k)$ and $S_l(k)$ is provided as a complex number and k represents the kth data in a time domain; and
   the early-late detector circuit is configured to generate the error signals as $E_r(k)$ according to the following equation:

$E_r(k)=|S_e(k)|^2-|S_l(k)|^2$.

9. The radio transmission controller of claim 7, wherein said early-late detector circuit is configured to detect early and late samples defined as values at half chip interval earlier and half chip interval later than on-time values, respectively.

10. The radio transmission controller of claim 9, wherein the code tracking loop is configured to select an on-time sample, used for despreading, demodulation and rake combining, for every N samples, where N equals a number of samples per chip.

11. The radio transmission controller of claim 9 wherein:
    the despreading circuit is configured to despread data samples from a plurality of slots of a dedicated physical control channel, each slot including 10 symbols, the 10 symbols providing pilot, transmit power control and transport format combination indicator (TFCI) bits.

12. The radio transmission controller of claim 7, wherein the code tracking loop is configured to provide timing tracking of multipath components of a direct sequence spread spectrum signal over a wireless multipath fading channel.

13. The radio transmission controller of claim 7, comprising a joint error signal calculator circuit provided as the early-late detector circuit configured to generate the error signals for the code tracking loop that is further configured to generate error signals for a second digital code tracking loop.

14. The radio transmission controller of claim 13, wherein the joint error signal calculator is configured to provide an indication of a relative delay τ between two different multipath components of a composite signal.

15. The radio transmission controller of claim 14, wherein the joint error signal calculator is configured to provide the relative delay τ between the two different multipath components as an indication of a delay for signal interference calculation.

16. A method for receiving spread spectrum signals by providing a digital code-tracking loop for use with wireless communications transmitted in a predetermined slotted time frame format comprising:
   despreading early and late data samples by use of a pseudonoise sequence;
   generating error signals from the output generated by the despreading; and
   providing an adjustment for providing timing tracking for a plurality of on-time, early and late samples, the adjustment determined by a control signal, but not the magnitude of the samples or error signals, the control signal based on a sign but not a magnitude of an accumulation of the generated error signals such that a data rate of the control signal is a fractional proportion of a data rate of the error signals and such that updated timing tracking is provided every 2 frames.

17. The method of claim 16, wherein the despread data samples include early despread data samples $S_e(k)$ and late despread data samples $S_l(k)$ and wherein:
   each $S_e(k)$ and $S_l(k)$ is provided as a complex number, k, that represents a kth data in a time domain; and
   the error signals are provided as $E_r(k)$ according to the following equation:

$$E_r(k)=|S_e(k)|^2-|S_l(k)|^2.$$

18. The method of claim 16, wherein the early and late samples are defined in the despreading as values at half chip interval earlier and half chip interval later than on-time values, respectively.

19. The method of claim 18, wherein for every N samples, where N equals a number of samples per chip, one sample provides an on-time synchronized sample, used for despreading, demodulation and rake combining, the code tracking loop selecting the on-time sample.

20. The method of claim 18, wherein:
   the despreading despreads data samples from a plurality of slots of a dedicated physical control channel, each slot including 10 symbols, the 10 symbols providing pilot, transmit power control and transport format combination indicator (TFCI) bits.

21. The method of claim 18, comprising:
   in the case of a low sampling rate input data, adjusting timing for on-time and early/late samples forward or backward by a fraction of chip; and
   using an interpolator to generate on-time samples, and early/late samples offset by an amount of time derived from the previous samples.

22. The method of claim 16 comprising:
   the adjustment providing timing tracking, the early and late samples are defined as values at half chip interval earlier and half chip interval later than on-time values, respectively; a chip interval established as a time interval to transmit one bit of spreading code; and
   a frequency of a chip interval is selected as approximately 3.84 MHz/s.

23. The method of claim 16, wherein the adjustment provides time tracking of multipath components of a direct sequence spread spectrum signal over a wireless multipath fading channel.

24. The method of claim 16, wherein the step of generating error signals is performed by jointly calculating the error signals for a plurality of code tracking loops.

25. The method of claim 24, wherein the jointly calculated error signals provide an indication of a relative delay τ between two different multipath components of a composite signal.

26. The method of claim 25, wherein the relative delay τ between the two different multipath components provides an indication of a delay for signal interference calculation.

27. A radio transmission controller implementing a digital code-tracking loop and configured for operation with wireless communications transmitted in a predetermined slotted time frame format, the radio transmission controller comprising:
   a plurality of despreading circuits, each despreading circuit configured to despread early and late data samples by use of a pseudonoise sequence;
   a circuit configured to generate error signals from the despread samples generated by the despreading performed by the plurality of despreading circuits;
   a plurality of circuits corresponding to the plurality of despreading circuits, configured to provide control signals based on a sign but not a magnitude of an accumulation of said generated error signals such that a data rate of the control signal is a fractional proportion of a data rate of said generated error signals; and
   a circuit configured to provide timing tracking adjustment determined by the control signals, but not the magnitude of the samples or error signals, for a plurality of on-time, early and late samples such that updated timing tracking is provided every 2 frames.

28. The radio transmission controller of claim 27, wherein:
   the plurality of despreading circuits are configured to provide an indication of a relative delay τ between a plurality of multipath components of a wideband channel such that the relative delay τ between the plurality of multipath components provides an indication of a delay for signal interference calculation.

29. The radio transmission controller of claim 27, wherein:
   the plurality of despreading circuits are configured to despread data samples which include early despread data samples $S_e(k)$ and late despread data samples $S_l(k)$, wherein each $S_e(k)$ and $S_l(k)$ is provided as a complex number and k represents a kth data in a time domain; and
   the circuit for providing the error signals is configured to provide said error signals as $E_r(k)$ according to the following equation:

$$E_r(k)=|S_e(k)|^2-|S_l(k)|^2.$$

30. The radio transmission controller of claim 27, wherein said circuit configured to provide said adjustment is configured to provide timing tracking, so as to provide the early and late samples as values at half chip interval earlier and half chip interval later than on-time values, respectively.

31. The radio transmission controller of claim 30, wherein:
   the despreading circuits are configured to despread data samples from a plurality of slots of a dedicated physical control channel each slot including 10 symbols, the 10 symbols providing pilot, transmit power control and transport format combination indicator (TFCI) bits.

32. The radio transmission controller of claim 27, comprising a joint error signal calculator circuit provided as the circuit configured to provide the error signals for at least two of the despreading circuits.

33. The radio transmission controller of claim 32, wherein the joint error signal calculator is configured to provide an indication of a relative delay $\tau$ between a plurality of multipath components of a composite signal.

34. The radio transmission controller of claim 33, wherein the joint error signal calculator is configured to provide the relative delay $\tau$ between the plurality of multipath components as an indication of a delay for signal interference calculation.

* * * * *